United States Patent [19]
Musiol et al.

[11] Patent Number: 5,900,677
[45] Date of Patent: May 4, 1999

[54] SENSING LOGIC SYSTEM AND METHOD FOR ADAPTIVE CONTROL OF VEHICLE RESTRAINT DEVICES

[75] Inventors: John A. Musiol, Sourthfield; Raymond J. Vivacqua, Northville, both of Mich.

[73] Assignee: Breed Automotive Technology, Inc., Lakeland, Fla.

[21] Appl. No.: 08/803,970

[22] Filed: Feb. 21, 1997

[51] Int. Cl.⁶ .................................................. B60R 21/26
[52] U.S. Cl. ..................... 307/10.1; 307/9.1; 280/735; 180/208; 701/45
[58] Field of Search .................... 307/9.1, 10.1; 280/727, 728.1, 728.2, 734, 735, 736, 742, 801.1, 801.2, 802, 803, 805, 806; 180/271, 272, 273, 274; 701/1, 29, 33, 36, 45, 46, 49

[56] References Cited

U.S. PATENT DOCUMENTS

| 5,411,289 | 5/1995 | Smith et al. | 280/73 |
| 5,531,472 | 7/1996 | Semchena et al. | 307/10.1 |
| 5,533,756 | 7/1996 | Dybro et al. | 280/806 |
| 5,605,202 | 2/1997 | Dixon | 280/735 |
| 5,626,359 | 5/1997 | Steffens, Jr. et al. | 280/735 |
| 5,718,451 | 2/1998 | White | 307/10.1 |

*Primary Examiner*—Jeffrey Gaffin
*Assistant Examiner*—Jonathan S. Kaplan
*Attorney, Agent, or Firm*—Markell Seitzman

[57] ABSTRACT

A system and method for controlling adaptive vehicle occupant restraint devices use a processor for receiving input signals from a plurality of sensors, for generating control parameters using a predetermined program, and for generating control signals from the control parameters to adaptively control the restraint devices during an accident.

19 Claims, 2 Drawing Sheets

SENSING LOGIC SYSTEM AND METHOD FOR ADAPTIVE CONTROL OF VEHICLE RESTRAINT DEVICES

BACKGROUND AND SUMMARY OF THE INVENTION

This disclosure relates to vehicle restraint devices, and in particular to a system and method for adaptively controlling vehicle restraint devices.

In passenger vehicles, passenger restraint systems employed for restraining passengers during an accident are designed to meet safety standards and assessment tests. Seat belts are typically simple retractable straps which hold the occupant in place. In a crash, the tension in the belt generally increases linearly with the amount of stretch imparted to it by the occupant. Thus, the tension in the belt is ever increasing which translates into increasing force levels imparted to the chest of the occupant. Since injuries are related to peak forces and accelerations sustained by occupants, this type of restraint is less than ideal.

A constant force retractor has a load limiting feature which eliminates this peak force application to the occupant. One such retractor is shown in U.S. Pat. No. 5,547,143, which is incorporated herein by reference.

A constant-force seat belt retractor system and air bag together create a restraint system which may be tuned to provide optimal restraint performance in a given crash situation for a given occupant. This system once tuned for a specific vehicle and occupant size will not account for the condition that various sized occupants require different restraint force levels for optimal protection. A system tuned for an average male at 35 mph may be more firm than is appropriate for a smaller, lighter occupant, while the system tuned for the average-sized person may have marginally adequate restraining capability to keep a rather heavy person from impacting the windshield or instrument panel.

Such lack of adaptability also involves several other factors, such as the rapidity of deployment of the air bag with correspondingly high deployment forces. Accidents less severe than the predetermined standards may cause vehicle occupants to experience different forces due to the inability of the system to recognize and adapt to different crash situations and occupant characteristics. A belted occupant may be more effectively restrained by a less firm air bag than is required for an occupant who is not wearing a seat belt.

The adaptive occupant restraint system and method is a significant improvement over the prior art as it is able to tailor occupant restraint during a crash to the specific occupant characteristics (weight, proximity to airbag, and seat belt usage) as well as to the crash severity.

A system for controlling adaptive vehicle occupant restraint devices uses a processor for receiving input signals from a plurality of sensors, for generating control parameters using a predetermined program, and for generating control signals from the control parameters to adaptively control the restraint devices during an accident.

DETAILED DESCRIPTION OF THE DRAWINGS

Figure 1:
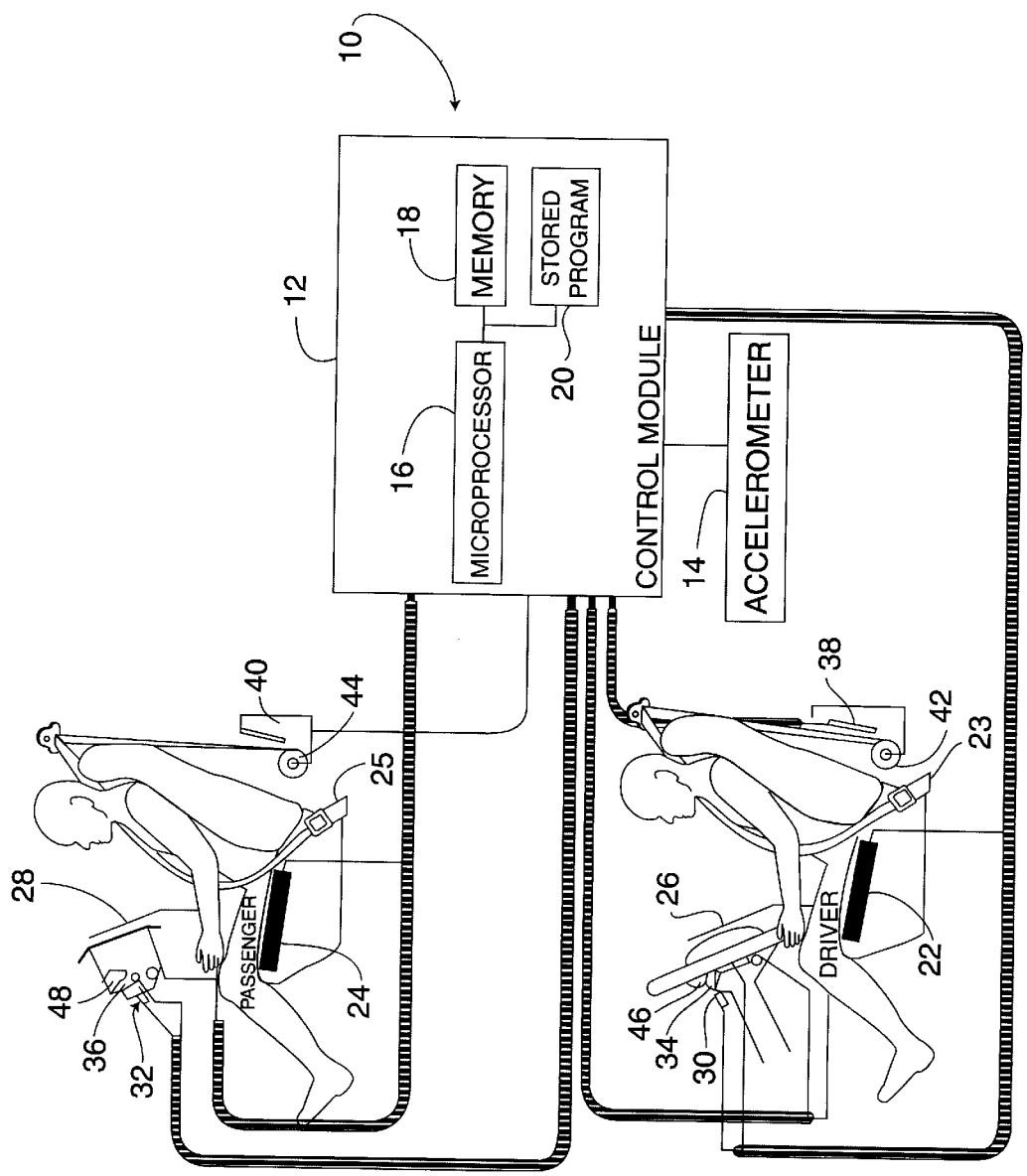
FIG. 1 is a schematic diagram of the disclosed adaptive control system.

Referring now in specific detail to the drawings, as shown in FIG. 1, the present disclosure describes an adaptive control system and method for adaptive vehicle restraint devices to provide adjustable restraint to occupants based on a plurality of factors, such as the weight of the occupants, the severity of the crash as well as the proximity of the occupants to the instrument panel, and whether the seat belt is fastened or not.

As shown in FIG. 1, the adaptive control system 10 is connected to the adaptive restraint devices and sensors of the vehicle, and includes an electronic control module 12 and an accelerometer 14. The control module 12 houses a microprocessor 16, a memory 18, and a stored program 20 for implementing the adaptive control method disclosed herein. The accelerometer 14 monitors deceleration of the vehicle compartment to determine crash severity. The control module 12 processes the input sensor signals from the accelerometer 14; the seat cushion force transducers 22, 24 measure occupant weight or mass; belt buckle switches 23, 25 indicate seat belt use; the occupant proximity sensors 26, 28 such as electric field sensors determine occupant proximity to the instrument panel or steering wheel; and temperature sensors 30, 32 adjacent the inflators 34, 36, respectively, determine whether to fire the inflators 34, 36 of the air bag modules and to activate the pretensioners 38, 40 of the constant force retractors 42, 44 of the seat belt, respectively, such as that disclosed in U.S. Pat. No. 5,547,143, which is incorporated herein by reference.

The disclosed adaptive control system and method has the microprocessor 16 assign a crash severity to the crash based on the acceleration signal from the accelerometer 14. Using the sensor signals from the sensors, the control module 12 determines the factors in Table 1 and generates control signals for air bag and seat belt operation.

The multi-level feature of the seat belt retractors 42, 44 (such as shown in U.S. Pat. No. 5,547,143) adjust the load limiting levels of the multi-level constant force retractors, the multi-level inflators 34, 36 (as shown in U.S. Pat. No. 5,351,988 which is incorporated herein by reference) fill the air bags to differing levels of firmness, and multi-level venting devices 46, 48 vent the inflated air bags through the air bag module housing at different levels of air bag deflation to enable the occupant to ride down the crash with greater safety and reduced injury.

Figure 2:
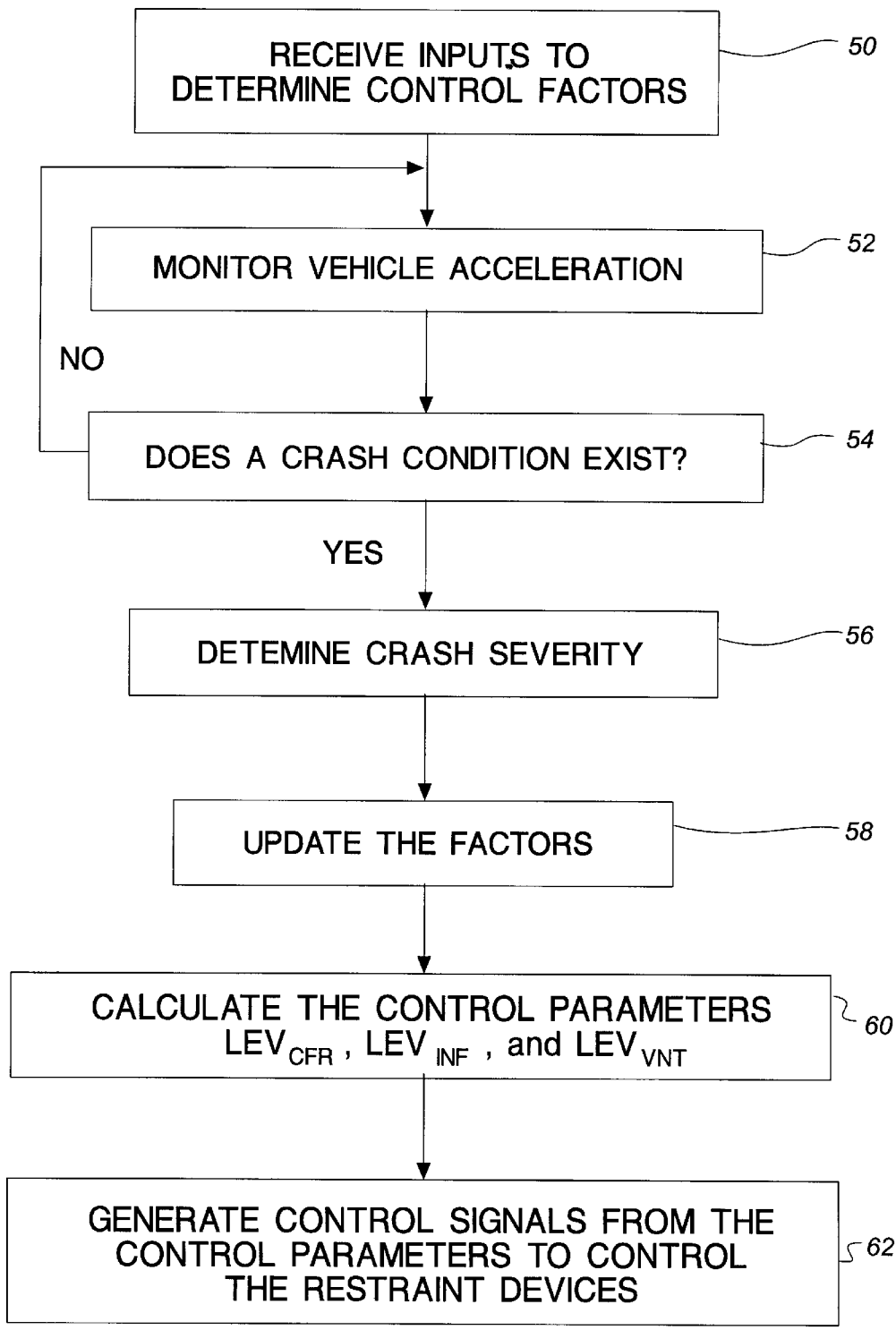
FIG. 2 is a flowchart of the operation of the adaptive control system.

As shown in FIG. 2, the disclosed adaptive control system 10 operates using the method including the steps of receiving inputs to determine the factors in step 50; monitoring vehicle acceleration in step 52 using the accelerometer 14; and determining a crash condition in step 54 from the acceleration signal of the accelerometer 14. If a crash condition exists in step 54, the method determines crash severity in step 56 using the acceleration signal; updates the factors in step 58 such as the occupant position; and calculates the control parameters $LEV_{MLCFR}$, $LEV_{MLINF}$, and $LEV_{MLVNT}$ in step 60, in which MLCFR refers to the multi-level constant force retractors 40, 42; MLINF refers to the multi-level inflators 34, 36; and MLVNT refers to the multi-level venting devices 46, 48. From such control parameters, control signals are generated in step 62 to control the multi-level restraint devices, such as the multi-level constant force retractors, the multi-level inflators, and the multi-level venting devices.

Upon determining the various inputs, the disclosed adaptive control system and method perform a decision making process to determine appropriate operation of the adaptive restraint devices. The disclosed adaptive control system and method receive the input sensor signals to determine values of the factors; for example, ranging from 0 to 1, with 1 being "Full Restraint" and less than 1 being more gentle. The control module 12 then uses the 10 microprocessor 16 and stored program 20 to generate control signals to operate the adaptive restraint devices. In an illustrative embodiment, the plurality of factors and their ranges of magnitudes are listed in Table 1.

TABLE 1

| Factor | Range of Magnitudes |
|---|---|
| A - Crash Severity | 1 = mild crash, |
|  | 10 = severe crash |
| B - Occupant Mass | 1 = light person |
|  | 10 = heavy person |
| C - Seat Belt Use | 1 = belted |
|  | 0 = unbelted |
| D - Occupant to Instrument Panel Proximity | 0 = touching |
|  | 10 = normally seated |
| E - Air Bag Module Temperature | 1 = 185° F. |
|  | 10 = –40° F. |

The activation and appropriate restraint levels are set for the multi-level constant force retractors (for the load limiting of the seat belt retractor), multi-level inflators (for inflation of the air bag), and the multi-Level vent devices (for venting or deflating the inflated air bag) in accordance with the following functions:

$$LEV_{MLCFR} = f_1(A, B, C, D, E, WA1, WB1, WC1, WD1, WE1) \quad (1)$$

$$LEV_{MLINF} = f_2(A, B, C, D, E, WA2, WB2, WC2, WD2, WE2) \quad (2)$$

$$LEV_{MLVNT} = f_3(A, B, C, D, E, WA3, WB3, WC3, WD3, WE3) \quad (3)$$

in which the weights WA1, WB1, WC1, WD1, WE1 are MLCFR weights; weights WA2, WB2, WC2, WD2, WE2 are MLINF weights; and weights WA3, WB3, WC3, WD3, WE3 are MLVNT weights of respective factors A, B, C, D and E. Such weights may be stored in the memory 18. Activation of the MLCFR, MLINF, and MLVNT occurs in proportion to the value of $LEV_{MLCFR}$, $LEV_{MLINF}$, and $LEV_{MLVNT}$, respectively.

If the crash is severe enough, the pretensioners will be activated, then the multi-level constant force retractors of the seat belts are activated according to the function $f_1$, determining $LEV_{MLCFR}$, for example:

$$LEV_{MLCFR} = 1 - ((Crashmax-A) * WA1) - ((Weightmax-B) * WB1) - ((Distmax-D) * WD1) \quad (7)$$

in which $LEV_{MLCFR}$ is the level used to activate the MLCFR, and WA1, WB1, and WD1 are the predetermined first weights or weighting factors for the respective factors A, B, and D. In an illustrative embodiment, WA1=0.05, WB1=0.05, and WD1=0.01. For the MLCFR, the maximum restraint force occurs when the occupant weight, occupant distance to the air bag, and crash severity are each maximum.

The severity of the crash also determines the activation level of the air bag. For crashes which are severe enough to require an air bag deployment, the optimum inflation level must be calculated, and so $LEV_{MLINF}$ reflects such a situation. For severe crashes, all of the factors may be taken into account, as in the illustrative embodiment of $LEV_{MLINF}$ in Equation (8) below:

$$LEV_{MLINF} = 1 - ((Crashmax - A) \times WA2) \quad (8)$$
$$- ((Weightmax - B) \times WB2)$$
$$- (C \times WC2)$$
$$- ((Distmax - D) \times WD2)$$
$$- ((Tempmin - E) \times WE2)$$

in which Crashmax is a predetermined scaled value for the maximum crash severity; Weightmax is a predetermined scaled value for the maximum weight of the seated passenger; Distmax is a predetermined scaled value for the maximum distance of the passenger from the air bag; Tempmin is a predetermined scaled value for the minimum temperature; and WA2, WB2, WD2, and WE2 are corresponding second weighting factors for the factors A, B, D, and E.

Typically, the inflator output is reduced as the temperature of the unit gets colder, so the inflator output is adjusted to compensate for this effect, such that the inflator produces inflation at full power when the unit is coldest, and adjusts it for all other (warmer) conditions. Accordingly, Equation (8) incorporates the minimum temperature condition to be the boundary for the determination of the $LEV_{MLINF}$ parameter.

As indicated in Table 1, for the scaled ranges of the magnitudes, Crashmax=10, Weightmax=10, Distmax=10, and Tempmin=10. The MLINF weighting factors WA2, WB2, WD2, and WE2 are weighting factors used for determining control of the inflator, and may be determined experimentally by physical testing and/or computer simulation. For example, WA2=0.01, WB2=0.06, WD2=0.01, and WE2=0.01.

Equation (8) determines a maximum restraint force to be applied when the factors are maximized; i.e. for the air bag inflator, maximum output occurs when the occupant weight, occupant distance to the air bag, and crash severity are maximum, and the occupant is not wearing a seat belt.

The air bag is vented according to:

$$LEV_{MLVNT} = 1 - ((Crashmax - A) \times WA3) \quad (9)$$
$$- ((Weightmax - B) \times WB3)$$
$$- (C \times WC3)$$
$$- ((Distmax - D) \times WD3)$$

Maximum restraint with minimum venting occurs for air bag venting at maximum occupant weight and distance and crash severity, and the occupant is not wearing a seat belt.

Alternative forms of Equations (7)–(9) may be used having the factors and/or weights added together to fit desired safety levels. Equations (7)–(9) may also be modified to provide non-linear determinations of the control parameters, incorporating such terms as:

$$((Crashmax-A) \times (WA1)^{exp}) \quad (10)$$

in which the exponent provides non-linearity.

Equations (7)–(9) result in the parameters $LEV_{MLCFR}$, $LEV_{MLINF}$, and $LEV_{MLVNT}$ ranging from zero to one, with one being the fullest restraining force, to generate an appropriate control signal for use in the adaptive control system and method to adjust the corresponding adaptive restraint devices.

In an alternative embodiment, the inflator may have a full output achieved when two actuators operate simultaneously, and lower outputs occur by applying a delay between actuations, so Equation (8) may be modified to be:

$$LEV_{MLINF} = ((Crashmax - A) \times WA2) \qquad (11)$$
$$+ ((Weightmax - B) \times WB2)$$
$$+ (C \times WC2)$$
$$+ ((Distmax - D) \times WD2)$$

In this form, the equation directly the delay between the inflator activators.

It is understood by those skilled in the art that various modifications may be made therein without departing from the scope and spirit of the invention, and so are to be considered within the scope of the invention.

We claim:

1. A system for controlling vehicle occupant restraint devices comprising:
   a processor receiving input signals from a plurality of sensors, generating control parameters proportional to continuously variable weighting factors using a predetermined program that processes at least seat belt related input signals and air bag related input signals/ according to a predetermined activation function, and generating control signals from the control parameters to control the restraint devices during a vehicular accident.

2. The system of claim 1 wherein the plurality of sensors comprises an accelerometer measuring the deceleration of a vehicle compartment and generating a corresponding acceleration signal as one of the input signals.

3. The system of claim 1 wherein the plurality of sensors comprises a first sensor determining a mass-related characteristic of an occupant and generating a corresponding mass-related signal as one of the input signals.

4. The system of claim 1 wherein the plurality of sensors comprises a switch determining a fastened condition of a seat belt and generating a corresponding seat belt-use signal as one of the input signals.

5. The system of claim 1 wherein the plurality of sensors comprises a proximity detector determining a proximity of an occupant thereto and generating a corresponding proximity signal as one of the input signals.

6. The system of claim 1 wherein the plurality of sensors comprises a temperature measurement device measuring the temperature of an inflator of one of the restraint devices, and generating a corresponding temperature signal as one of the input signals.

7. A system for controlling vehicle occupant restraint devices comprising:
   a plurality of sensors generating sensor signals;
   a control module operatively connected to the sensors and comprising:
   a processor receiving the sensor signals from the sensors, generating control parameters ($LEV_{MLCPR}$), ($LEV_{MLINF}$), ($LEV_{MLVNT}$) proportional to continuously variable weighting factors using a predetermined program performing a predetermined control value calculation, and generating control signals from the control parameters; and
   the restraint devices operating in response to the control signals during a vehicular accident.

8. The system of claim 7 wherein:
   the restraint devices comprise at least one of a seat belt comprising a seat belt fastener, and an air bag comprising an inflator; and
   the plurality of sensors comprises an accelerometer and at least one of a force measurement device measuring a mass-related characteristic of an occupant, a seat belt fastener switch determining a fastened condition of the seat belt, a proximity detector determining a proximity of an occupant thereto, and a temperature measurement device measuring the temperature of the inflator of the air bag.

9. The system of claim 7 wherein the plurality of sensors an accelerometer measuring the deceleration of a vehicle compartment and generating a corresponding acceleration signal as one of the input signals; and
   the processor, responsive to the acceleration signal, determines a condition of a vehicular accident, and, responsive to the condition of a vehicular accident, determines the control parameters and generates the control signals therefrom.

10. The system of claim 7 wherein the plurality of sensors comprises a force sensor determining a mass-related characteristic of an occupant and generating a corresponding mass-related signal as one of the input signals; and
    the processor, responsive to the mass-related signal as at least one of the input signals, generates an occupant mass factor for use by the predetermined program to generate the control parameters.

11. The system of claim 7 wherein the plurality of sensors comprises a seat belt fastener switch determining a fastened condition of a seat belt and generating a corresponding seat belt-use signal as one of the input signals; and
    the processor, responsive to the seat belt-use signal as at least one of the input signals, generates a seat belt-use factor used by the predetermined program to generate the control parameters.

12. The system of claim 7 wherein the plurality of sensors a proximity detector determining a proximity of an occupant thereto and generating a corresponding proximity signal as one of the input signals; and
    the processor, responsive to the proximity signal as at least one of the input signals, generates a proximity factor used by the predetermined program to generate the control parameters.

13. The system of claim 7 wherein the plurality of sensors comprises a temperature measurement device measuring the temperature of an inflator of an air bag of one of the restraint devices, and generating a corresponding temperature signal as one of the input signals; and
    the processor, responsive to the temperature signal as at least one of the input signals, generates a temperature factor used by the predetermined program to generate the control parameters.

14. A method for controlling vehicle occupant restraint devices comprising the steps of:
    generating sensor signals using a plurality of sensors;
    processing the sensor signals to generate control parameters proportional to continuously variable weighting factors using a predetermined program and;
    generating control signals from the control parameters;
    outputting the control signals to the restraint devices; and
    operating the restraint devices in response to the control signals during a vehicular accident.

15. The method of claim 14 wherein the step of processing comprises the step of generating the control parameters ($LEV_{MLCFR}$), ($LEV_{MLINP}$) and ($LEV_{MLVNT}$) using the predetermined program performing a predetermined control value calculation.

16. The method of claim 14 wherein the step of operating the restraint devices comprises at least one of the steps of:
    adjusting a variable level constant force retractor of a seat belt;

controlling the inflation of an air bag; and controlling the venting of an inflated air bag.

17. The method of claim 14 wherein the step of generating the sensor signals comprises at least one of the steps of:

generating an acceleration signal using an accelerometer;

measuring a mass-related characteristic of an occupant;

determining a fastened condition of a seat belt;

determining a proximity of an occupant to a proximity sensor; and measuring the temperature of an inflator of an air bag.

18. The method of claim 14 wherein the step of generating the sensor signals comprises the steps of:

measuring the deceleration of a vehicle compartment using an accelerometer; and generating a corresponding acceleration signal as one of the input signals.

19. The method of claim 18 further comprising the steps of:

receiving the acceleration signal at the processor;

determining a condition of a vehicular accident; and determining the control parameters and generating the control signals therefrom in response to the condition of a vehicular accident.

\* \* \* \* \*